US006970726B2

(12) United States Patent
Takayanagi (10) Patent No.: US 6,970,726 B2
(45) Date of Patent: Nov. 29, 2005

(54) MOBILE STATION HAVING SHORT-RANGE RADIO FUNCTION AND POWER CONSUMPTION REDUCTION METHOD THEREFOR

(75) Inventor: Asako Takayanagi, Tokyo (JP)

(73) Assignee: NEC Corporation, Tokyo (JP)

( * ) Notice: Subject to any disclaimer, the term of this patent is extended or adjusted under 35 U.S.C. 154(b) by 443 days.

(21) Appl. No.: 10/194,737

(22) Filed: Jul. 12, 2002

(65) Prior Publication Data

US 2003/0148760 A1    Aug. 7, 2003

(30) Foreign Application Priority Data

Jul. 23, 2001    (JP) ............... 2001-222065

(51) Int. Cl.⁷ ............................................. H04B 1/38
(52) U.S. Cl. ............... 455/574; 455/127.5; 455/343.1; 455/343.2
(58) Field of Search ............... 455/574, 127.1, 455/127.5, 343.2, 11.1, 13.4, 343.1, 343.5, 455/420, 421

(56) References Cited

U.S. PATENT DOCUMENTS

| 5,936,546 | A  | * | 8/1999  | Nasuda ................ 340/7.33 |
| 6,246,862 | B1 | * | 6/2001  | Grivas et al. ............ 455/566 |
| 6,445,937 | B1 | * | 9/2002  | daSilva ................. 455/574 |
| 6,571,103 | B1 | * | 5/2003  | Novakov ................ 455/464 |
| 6,600,902 | B1 | * | 7/2003  | Bell ..................... 455/41.2 |
| 6,667,731 | B2 | * | 12/2003 | Park .................... 345/102 |
| 2002/0077060 | A1 | * | 6/2002 | Lehikoinen et al. ....... 455/41 |
| 2005/0130713 | A1 | * | 6/2005 | Simpson et al. .......... 455/574 |
| 2005/0130714 | A1 | * | 6/2005 | Lin ..................... 455/574 |

FOREIGN PATENT DOCUMENTS

| EP | 1 115 054 A2 | 7/2001 |
| GB | 2 361 606 A | 10/2001 |
| JP | 7-38937 | 2/1995 |
| JP | 10-98427 | 4/1998 |
| JP | 10-210563 | 8/1998 |
| JP | 11-186951 | 7/1999 |
| JP | 2994274 | 10/1999 |
| JP | 2000-228647 | 8/2000 |
| JP | 2000-295178 | 10/2000 |
| JP | 2001-8263 | 1/2001 |

OTHER PUBLICATIONS

U.K. Examination Report dated Sep. 1, 2004.

* cited by examiner

Primary Examiner—CongVan Tran
(74) Attorney, Agent, or Firm—Scully, Scott, Murphy & Presser (57) ABSTRACT

A mobile station with a short-range radio function includes a radio section which communicates with a base station and a short-range radio section for performing short-range radio communication independently of the radio section. This mobile station further includes a control section for shifting the short-range radio function of the short-range radio section to a low power consumption mode in accordance with the state of short-range radio communication.

26 Claims, 6 Drawing Sheets

FIG.6

MOBILE STATION HAVING SHORT-RANGE RADIO FUNCTION AND POWER CONSUMPTION REDUCTION METHOD THEREFOR

BACKGROUND OF THE INVENTION

1. Field of the Invention

The present invention relates to a mobile station in a mobile communication system and, more particularly, to a mobile station with a short-range radio function which includes a radio section for communication with a base station and a radio section for short-range radio communication which performs communication with an apparatus with a short range, and a power consumption reducing method for the mobile station.

2. Description of the Prior Art

Recently, mobile communication systems such as a portable telephone system have become widespread.

In such a mobile communication system, radio communication is performed between a mobile station, i.e., a cell phone or radio portable terminal apparatus and a base station connected to a telephone network, thereby allowing communication with another telephone set or communication apparatus connected to the telephone network.

One of the communication schemes used by such mobile communication systems is CDMA (Code Division Multiple Access).

According to CDMA, on the transmitting side, data is spread by using one of predetermined spreading codes which differ depending on the data to be transmitted, and the spread data is transmitted. On the receiving side, the data is obtained by spreading (so-called despreading) the reception signal by using a spreading code identical to the one used on the transmitting side (to be precise, a code complex conjugate to the spreading code on the transmitting side). In such communication based on CDMA, the peak correlation value of a signal received on the receiving side is found out by shifting the despreading timing, thereby regenerating the signal transmitted from the transmitting side.

The variety of applications for recent mobile stations has increased as the number of users has increased. For example, demands have arisen for mobile stations that can transmit/receive data to/from information processing apparatuses such as a personal computer (to be referred to as a "PC" hereinafter). Such transmission/reception of data is preferably performed by radio communication in consideration of user's operability, and studies have begun to be made on interfaces for short-range radio communication.

As such short-range radio communication means, infrared communication, Bluetooth, and the like are known. By mounting such a short-range radio communication means in a mobile station like a cell phone, short-range radio communication by the mobile station is realized.

In this case, the mobile station is equipped with a radio section for the above short-range radio communication and a radio section as an essential radio section which is used to communicate with a base station. Its power consumption tends to increase more than before.

Demands, however, have arisen for smaller, lighter mobile stations which can be used for a longer period of time in a mobile communication system for cell phones or the like. For this purpose, the built-in batteries for driving mobile stations are reduced in size. To allow a mobile station to operate for a long period of time with such a compact battery, it becomes important to attain a reduction in power consumption in the mobile station.

In a conventional short-range radio communication procedure, when connection begins to be established, one unit emits a radio wave, and the other unit detects the radio wave to establish a link.

Synchronization is established by this procedure, and communication is started between the units whose connection has been established. A procedure for shifting to a state wherein power consumption is suppressed while a link is kept established when a condition occurs in which there is no data to be transmitted/received while the link is established is available as a conventional technique.

In this case, although a side on which link synchronization management is performed (to be referred to as a "master" hereinafter) can issue a transition instruction for a state shift, a side which complies with link synchronization (to be referred to as a "slave" hereinafter) can only generate a request and requires a consent from the remote unit. There has been no rule stating that when, for example, data communication is to be performed between a cell phone and a PC by using a radio interface, a specific one of the units should play the main role. That is, roles are variably assigned to such units.

In a conventional cell phone, the supply of power to circuits unnecessary for a standby state is stopped. For example, the power consumption is minimized by automatically turning off the backlight when neither input operation nor interrupt occurs for a predetermined period of time or automatically stopping setting operation when no input operation is done during the setting operation and shifting to a power saving standby state. In this manner, attempts are made to prolong the maximum battery time.

The following problems arise in the above conventional mobile station in a mobile communication system used for cell phones and the like.

First, in short-range radio communication, when a given unit operates on the side to be found in connection (slave side), it keeps emitting radio waves. That is, when a given unit operates on the side on which the short-range radio function is turned on to make a search (master side), a function of setting a time during which a search is made is prepared for the unit. If, however, a given unit operated on the side to be found, and no remote unit cannot be found, the unit keeps emitting radio waves until the user turns off the short-range radio function.

When the short-range radio function of a cell phone is to be used, the user may put the cell phone in a bag while the short-range radio function is kept on, and forgets turning off the function. As a consequence, the cell phone keeps consuming power against user's will. This may interfere with the power saving function of the cell phone and affect the standby time and speech communication time of the cell phone.

The adverse effect of radio waves on medical equipment has been brought to the fore, and radio waves in crowed places, in particular, have become a social issue. Under the circumstances, unnecessary emission of radio waves may worsen such a problem in consideration of areas where cell phones are used.

Second, the low power consumption mode prepared for conventional short-range radio communication may not always be effectively used, and a cell phone may waste power. This is because a shift to the low power consumption mode or restoration therefrom is not triggered by any specific condition, and there has been no means for making a mode shift from the cell phone side

SUMMARY OF THE INVENTION

The present invention has been made in consideration of the above problems in a conventional mobile station, and has as its object to provide a mobile station with a short-range radio function, which can prevent unnecessary radio wave from being kept transmitted when the short-range radio function is turned on, and minimize power consumption by shifting to a low power consumption mode when there is no data to be transmitted/received by using the short-range radio function.

It is another object of the present invention to improve operability by restoring the short-range radio function from the low power consumption mode by using an interrupt monitoring function which is a conventional technique concerning power saving in a cell phone.

In order to achieve each object described above, according to the first aspect of the present invention, there is provided a mobile station with a short-range radio function including a radio section which communicates with a base station and a short-range radio section for performing short-range radio communication independently of the radio section, comprising control means for shifting the short-range radio function of the short-range radio section to a low power consumption mode in accordance with a state of short-range radio communication.

In order to achieve each object described above, according to the second aspect of the present invention, there is provided a mobile station with a short-range radio function including a radio section which communicates with a base station and a short-range radio section for performing short-range radio communication independently of the radio section and having a power saving mode of turning off a backlight mounted on a display portion when no operation is performed by a user for not less than a predetermined period of time, comprising control means for shifting the short-range radio function of the short-range radio section to a low power consumption mode in synchronism with the power saving mode.

In order to achieve each object described above, according to the third aspect of the present invention, there is provided a folding mobile station with a short-range radio function including a radio section which communicates with a base station and a short-range radio section for performing short-range radio communication independently of the radio section, comprising control means for shifting the short-range radio function of the short-range radio section to a low power consumption mode when the mobile station is set in a form in which the short-range radio function is not used.

In order to achieve each object described above, according to the fourth aspect of the present invention, the control means in the first aspect shifts the short-range radio function of the short-range radio section to the low power consumption mode when no data is exchanged by short-range radio communication for not less than a predetermined period of time.

In order to achieve each object described above, according to the fifth aspect of the present invention, the mobile station with the short-range radio function in the second aspect further comprises control means for, when operation is done by the user in the power saving mode, restoring the short-range radio function of the short-range radio section from the low power consumption mode upon execution of control for restoration from the power saving mode to a normal mode in which the backlight is turned on.

In order to achieve each object described above, according to the sixth aspect of the present invention, the mobile station with the short-range radio function in the third aspect further comprises control means for restoring the short-range radio function of the short-range radio section from the low power consumption mode when the mobile station in the low power consumption mode is set in a form in which the short-range radio function is used.

In order to achieve each object described above, according to the seventh aspect of the present invention, the low power consumption mode described in any one of the first to fourth aspects is a mode of stopping supply of power to the short-range radio section.

In order to achieve each object described above, according to the eighth aspect of the present invention, the low power consumption mode described in any one of the first to fourth aspects is a mode of intermittently stopping supply of power to the short-range radio section.

In order to achieve each object described above, according to the ninth aspect of the present invention, there is provided a power consumption reducing method for a mobile station with a short-range radio function including a radio section which communicates with a base station and a short-range radio section for performing short-range radio communication independently of the radio section, wherein power consumption is reduced by shifting the short-range radio function of the short-range radio section to a low power consumption mode in accordance with a state of short-range radio communication.

In order to achieve each object described above, according to the 10th aspect of the present invention, there is provided a power consumption reducing method for a mobile station with a short-range radio function including a radio section which communicates with a base station and a short-range radio section for performing short-range radio communication independently of the radio section and having a power saving mode of turning off a backlight mounted on a display portion when no operation is performed by a user for not less than a predetermined period of time, wherein power consumption is reduced by shifting the short-range radio function of the short-range radio section to a low power consumption mode in synchronism with the power saving mode.

In order to achieve each object described above, according to the 11th aspect of the present invention, there is provided a power consumption reducing method for a folding mobile station with a short-range radio function including a radio section which communicates with a base station and a short-range radio section for performing short-range radio communication independently of the radio section, wherein power consumption is reduced by shifting the short-range radio function of the short-range radio section to a low power consumption mode when the mobile station is set in a form in which the short-range radio function is not used.

In order to achieve each object described above, according to the 12th aspect of the present invention, power consumption is reduced by shifting the short-range radio function of the short-range radio section to the low power consumption mode when no data is exchanged by short-range radio communication for not less than a predetermined period of time.

In order to achieve each object described above, according to the 13th aspect of the present invention, the low power consumption mode described in any one of the ninth to 12th aspects is a mode of stopping supply of power to the short-range radio section.

In order to, achieve each object described above, according to the 14th aspect of the present invention, the low power consumption mode described in any one of the ninth to 12th aspects is a mode of intermittently stopping supply of power to the short-range radio section.

As is understood from each aspect described above, the present invention is configured to automatically turn off the short-range radio function if there is no remote station to connect after a lapse of a predetermined period of time from the time when a radio wave for the standby state has began to be transmitted in the short-range radio function ON state. This makes it possible to obtain the following three effects.

First, this can prevent unnecessary radio waves from being kept transmitted.

Second, when the short-range radio function of the mobile station is to be used, this can prevent the user from forgetting to turn off the short-range radio function while the function is not used or after the use of the function.

Third, this can prevent power from being wasted by sending out unnecessary radio waves.

With a trigger for shifting the short-range radio function to the low power consumption mode, the low power consumption mode function of the short-range radio can be requested or activated from the mobile station side. This makes it possible to minimize the consumption of valuable power for the cell phone.

In addition, when short-range radio communication is to be restored from the mobile station side, since it is expected that the user will operate the mobile station, a request to restore from the low power consumption mode of the short-range radio function is given to the remote station for short-range radio communication in response to the operation of unfolding the mobile station or restoration from the power saving mode of the mobile station upon monitoring an interrupt such as key input operation. This makes it possible to improve operability.

The above and many other objects, features and advantages of the present invention will become manifest to those skilled in the art upon making reference to the following detailed description and accompanying drawings in which preferred embodiments incorporating the principle of the present invention are shown by way of illustrative examples.

DETAILED DESCRIPTION OF THE PREFERRED EMBODIMENTS

A preferred embodiment of the present invention will be described below with reference to the accompanying drawings.

The following embodiment will exemplify a case wherein the present invention is applied to a mobile station in a CDMA mobile communication system.

Figure 1:
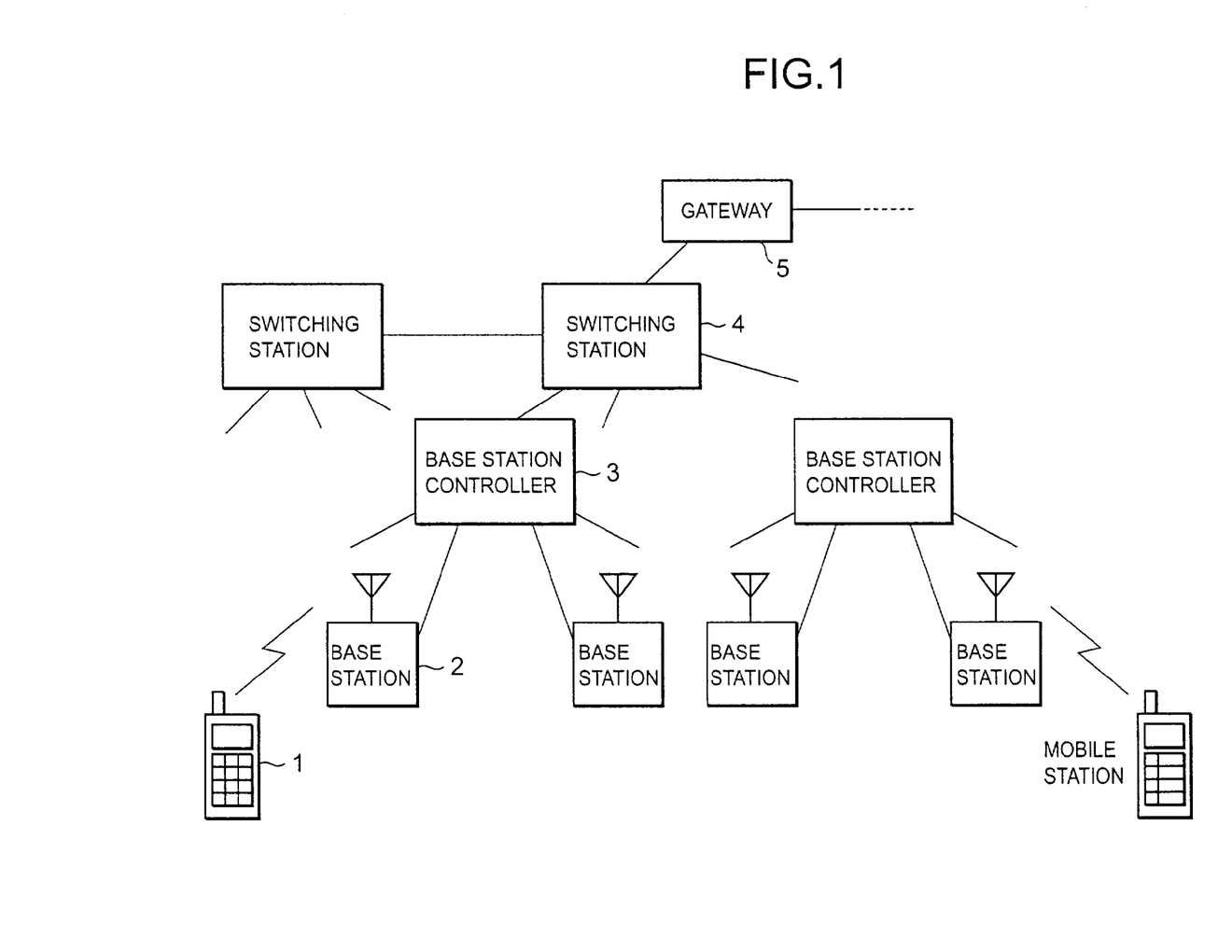
FIG. 1 is a block diagram showing a schematic arrangement of a CDMA mobile communication system to which a mobile station according to the present invention is applied.

Referring to FIG. 1 showing a schematic arrangement of the CDMA mobile communication system to which a mobile station according to the present invention is applied, ATM (Asynchronous Transfer Mode) communication techniques and the like have been applied to base stations, base station controllers, and switching stations constituting a network for a mobile communication system in consideration of the diversification (trends toward multimedia) of services provided by the mobile communication system and the efficient use (statistical multiplexing) of transmission paths that connect the respective base stations, base station controllers, and switching stations.

A mobile station 1 communicates with another mobile station in the mobile communication system, a terminal apparatus connected to another network, or the like. The mobile station 1 can perform various types of communications, e.g., speech communication and data communication.

Transmission data from the mobile station 1 is transmitted as communication data to a base station 2 by radio communication The base station 2 performs various processes for the communication data received from the mobile station 1 or other mobile stations, e.g., assembling the data into ATM cells, and transmits the resultant data to a base station controller 3.

In this manner, base stations transmit information in the form of ATM cells within the network regardless of whether the communication data in a radio zone is speech data, image data, or data in other forms. This makes it possible to easily cope with multimedia communication forms.

The base station controller 3 routes the ATM cells received from the base station 2 for each user, and transmits them to switching stations 4 or other subordinate base stations. The switching station 4 routes the ATM cells received from the base station controller 3 for each user, and transmits them to other switching stations or a gateway 5.

In such ATM cell transmission, ATM cells may be made to flow in a transmission path upon generation of the ATM cells. This obviates the necessity to prepare a transmission path for each predetermined channel in a conventional system. Therefore, a statistical multiplexing effect can be obtained, and transmission paths can be efficiently used. Note that the gateway 5 is used to relay data to another network.

In transmitting data from the network side to the mobile station 1, the base station 2 performs primary modulation such as QPSK, then performs spread spectrum modulation as secondary modulation, and transmits the spread signal, whose spectrum is spread to a frequency bandwidth centered on a predetermined frequency (intermediate frequency). The mobile station 1 uses a demodulation circuit to demodulate the reception signal from the base station 2 by despreading it, thereby regenerating the data from the network side.

Figure 2:
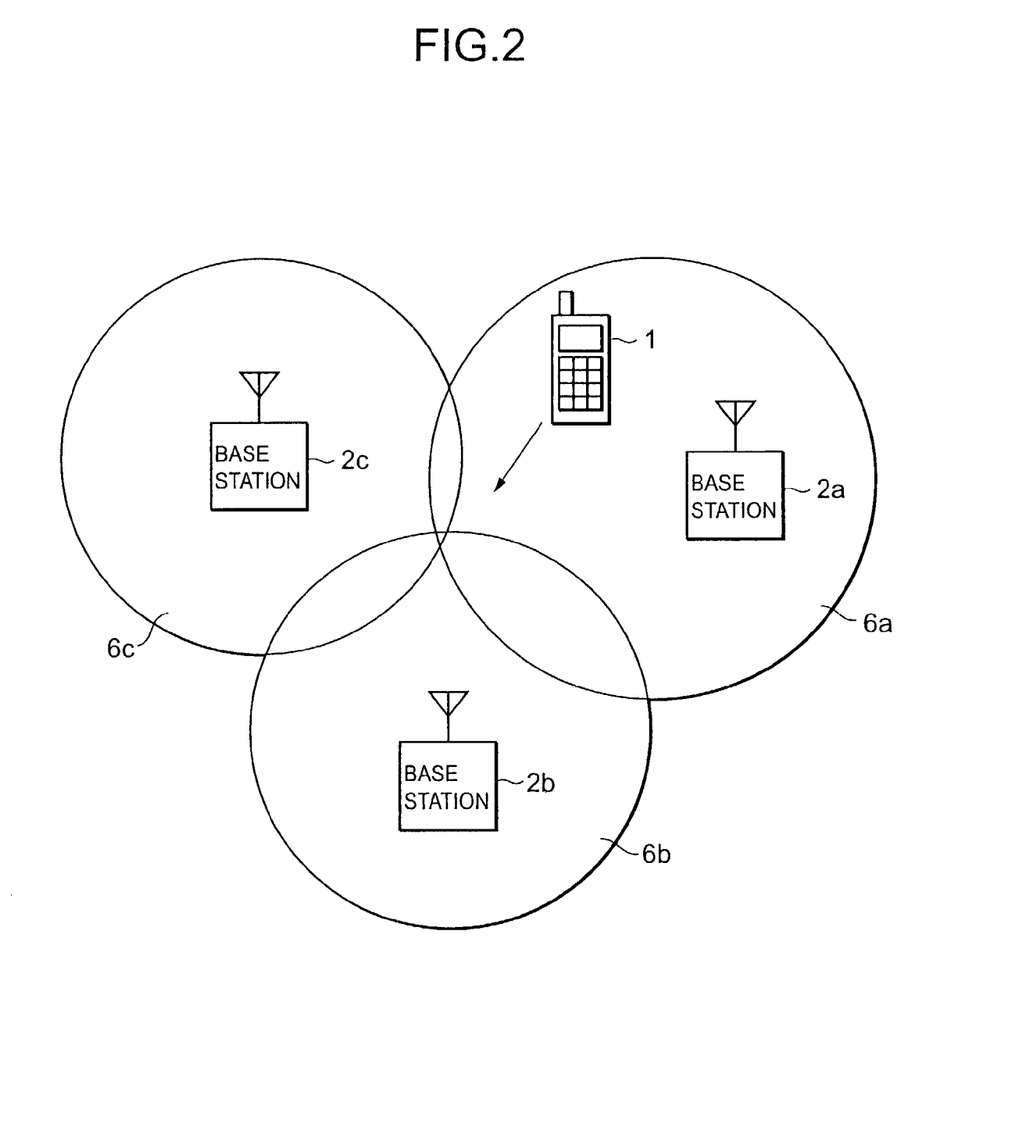
FIG. 2 is a block diagram showing a communication environment for the CDMA mobile communication system to which the mobile station in FIG. 1 is applied.

FIG. 2 is a block diagram showing a communication environment for the CDMA mobile communication system to which the mobile station 1 shown in FIG. 1 is applied. The CDMA mobile communication system shown in FIG. 2 uses the cellular scheme. In this system, the range covered by a base station 2a is a cell 6a, the range covered by a base station 2b is a cell 6b, and the range covered by a base station 2c is a cell 6c.

Figure 3:
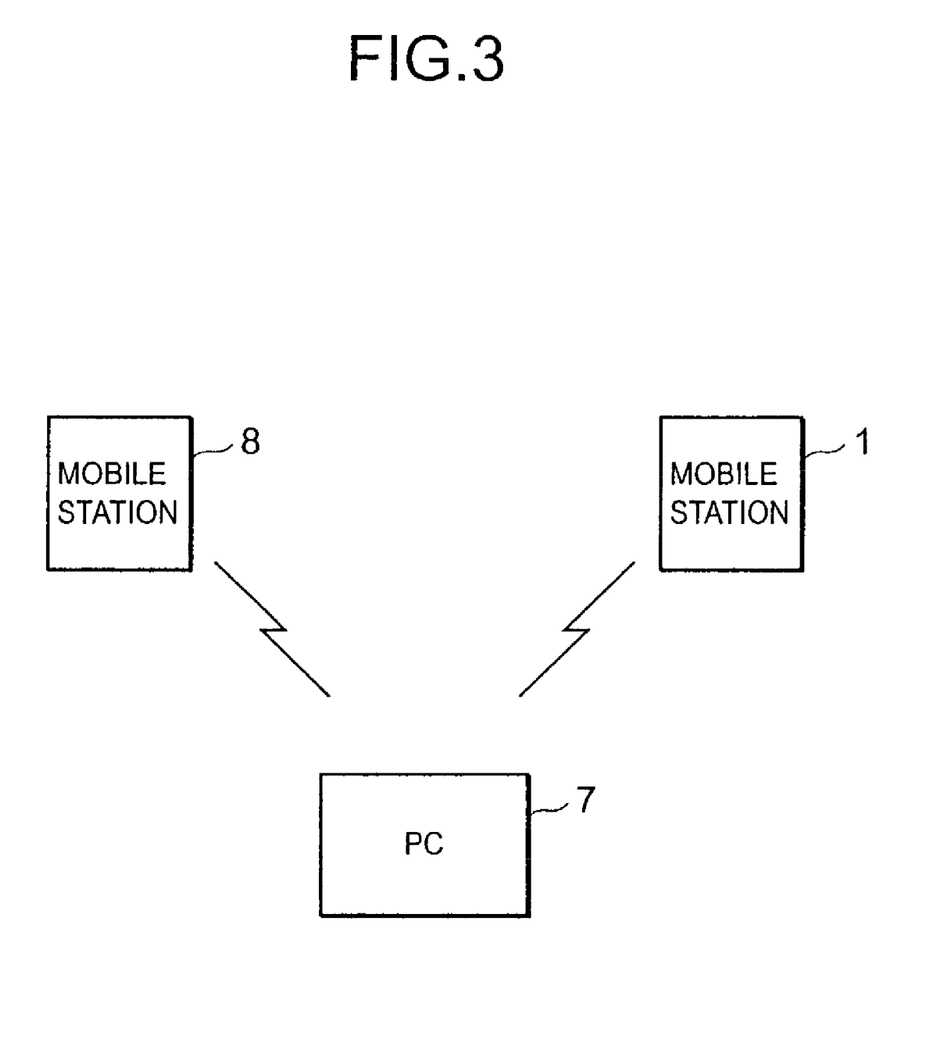
FIG. 3 is a block diagram showing an arrangement concerning short-range radio communication to which the mobile station in FIG. 1 is applied.

FIG. 3 is a block diagram showing an arrangement concerning short-range radio communication, to which the mobile station 1 shown in FIG. 1 is applied.

As shown in FIG. 3, in this embodiment, the mobile station 1 and a PC (personal computer) 7 perform short-range radio communication. As a communication scheme for this operation, an infrared communication scheme like IrDA or Bluetooth may be used.

In this embodiment, the PC 7 and mobile station 1 serve as a master and slave, respectively. In this case, the PC 7 serving as a master can also communicate with a mobile station 8 serving as a slave other than the mobile station 1.

Figure 4:
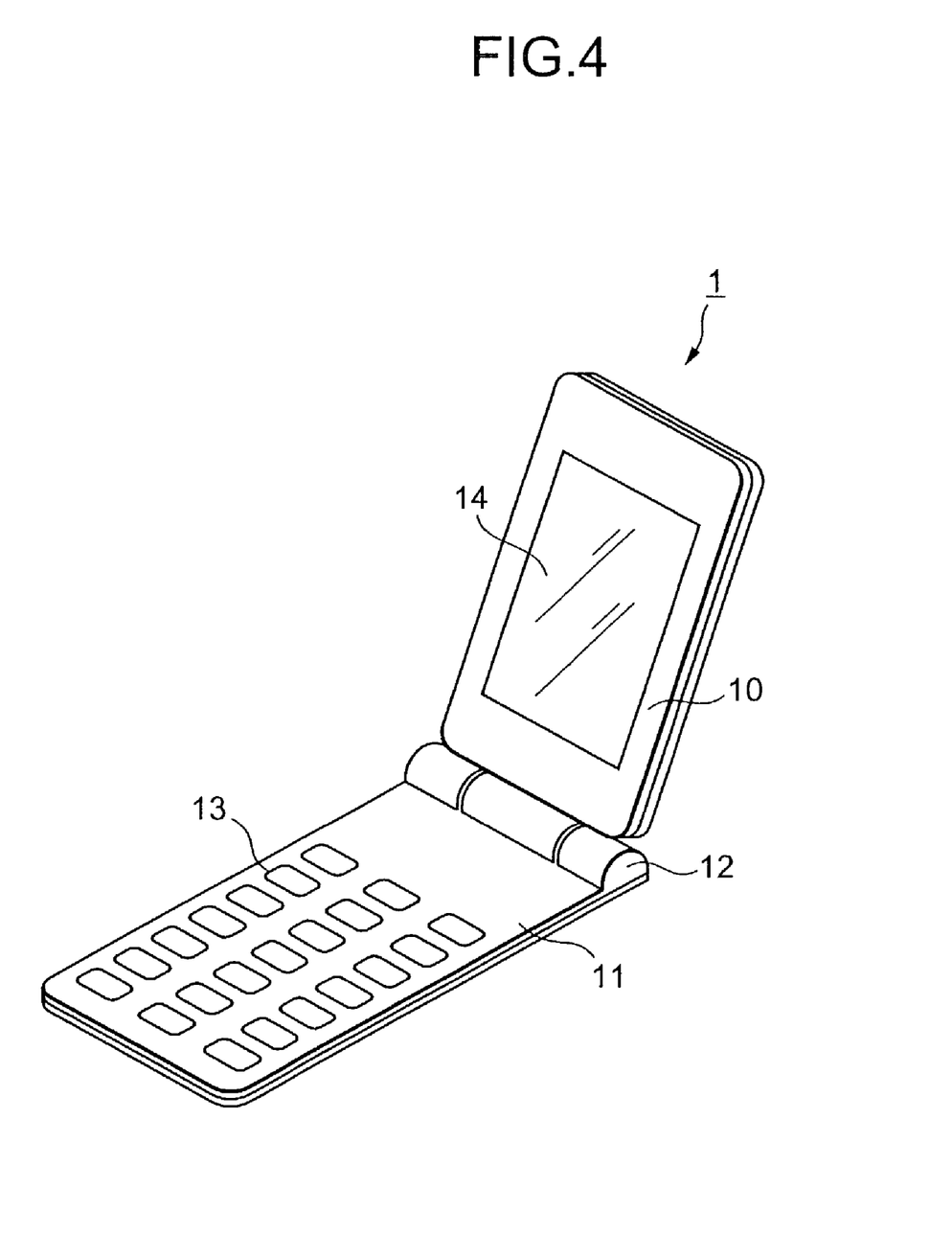
FIG. 4 is a perspective view showing the outer appearance of the mobile station in FIG. 1.

FIG. 4 is a perspective view showing the outer appearance of the mobile station 1 in FIG. 1.

As shown in FIG. 4, the mobile station 1 of this embodiment is constituted by upper and lower portions 10 and 11 which are coupled to each other through a hinge portion 12. The mobile station 1 can be folded along the hinge portion 12 serving as an axis such that the upper and lower portions 10 and 11 are stacked on each other.

The upper portion 10 of the mobile station 1 has a display portion 14 for displaying information from the mobile station 1 to the user. The lower portion 11 has an operating portion 13 having input keys to be operated by the user to input information. The display portion 14 is formed from, for example, a liquid crystal. The user can clearly see the contents displayed on the display portion 14 even in a dark place by turning on a backlight mounted on the back side of the liquid crystal.

Figure 5:
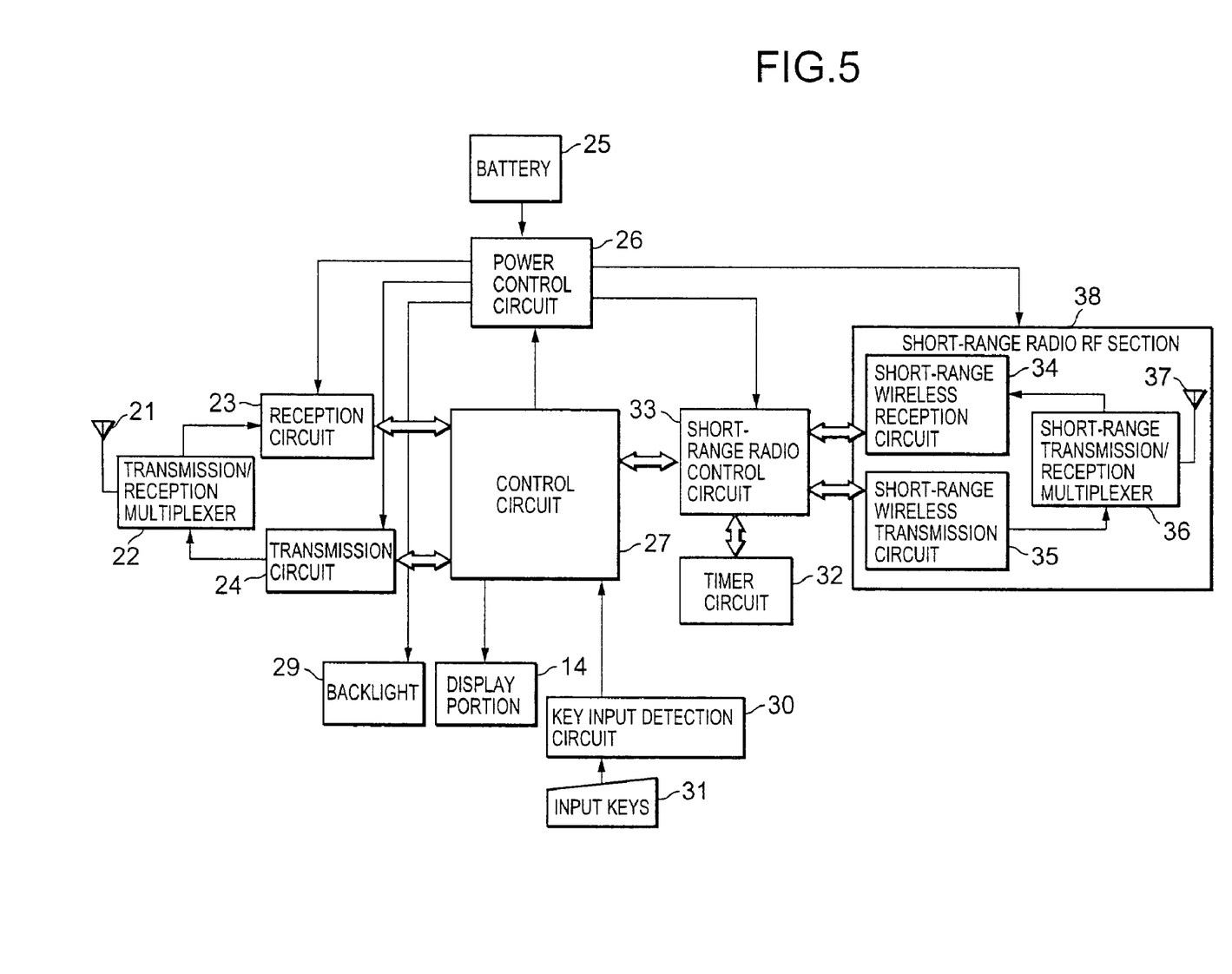
FIG. 5 is a block diagram showing an example of the mobile station in FIG. 1.

FIG. 5 is a block diagram showing an arrangement of the mobile station 1 shown in FIG. 1.

As shown in FIG. 5, the mobile station 1 is comprised of an antenna 21 used for communication with a base station, a transmission/reception multiplexer 22 for branching between transmission and reception, a reception circuit 23 for processing the reception of a radio signal from a base station, a battery 25 for supplying power to the mobile station 1, a power control circuit 26 for controlling the supply of power to each component upon reception of a notification about the state of the mobile station 1 from a control circuit 27, the display portion 14 for displaying telephone numbers, the reception of incoming calls, setting/input guides for various functions, and the like, input keys 31 arranged on the operating portion 13 which are used to input a telephone number and operate various functions, a key input detection circuit 30 for always detecting the press of each input key 31 and notifying the control circuit 27 of the corresponding information, a backlight 29 which is mounted on the display portion 14 and turned on/off on the basis of power control by the power control circuit 26, the control circuit 27 for monitoring the state of the mobile station 1, e.g., the state of transmission/reception, the state of interrupt such as key input operation, and the state of short-range radio communication and controlling the mobile station 1, a timer circuit 32 for measuring the time, a short-range radio control circuit 33 for monitoring the state of short-range radio communication, and a short-range radio RF section 38 for performing short-range radio communication.

The short-range radio RF section 38 is comprised of an antenna 37 used for short-range radio communication, a short-range transmission/reception multiplexer 36 for branching between transmission and reception, a short-range wireless transmission circuit 35 for transmitting a radio signal for short-range radio communication, and a short-range wireless reception circuit 34 for receiving a radio signal from another short-range radio unit.

The short-range radio control circuit 33 monitors a short-range radio wave from the short-range radio RF section 38, and clears the count value of the timer circuit 32 to zero every time data communication is actually performed. When the count value of the timer circuit 32 becomes a predetermined value, i.e., the time during which no data communication is actually done becomes equal to or longer than a predetermined period of time, the short-range radio control circuit 33 notifies the control circuit 27 of the corresponding information.

The operation of the mobile station 1 according to this embodiment will be described next with reference to the flow chart shown in FIG. 6.

First of all, the user turns on the power of the MS (Mobile Station), i.e., the mobile station 1, and sets a short-range radio function by operating the input keys 31 (S1).

According to the settings on the mobile station 1 of this embodiment, for example, a power setting on the short-range radio function can be selected from "normally ON", "OFF" for forcibly stopping the short-range radio function when it is activated by "normally ON", and "ON OFF in synchronism with operation" which is realized by the present invention.

Note that in the following description, "turning on short-range radio function" is equivalent to selecting "ON OFF according to operation".

When the user turns on the short-range radio function ("OFF, according to operation") (S2) and the flow advances to the operating of waiting for a short-range radio wave on the searched side (slave) (S3), the short-range radio control circuit 33 starts counting by the timer circuit 32, and starts transmitting a radio signal through the short-range wireless transmission circuit 35, transmission/reception multiplexer 36, and antenna 37.

If no connection request is received from another short-range radio unit for a lapse of a predetermined time (X sec) (S4 and S5), the timer circuit 32 notifies the short-range radio control circuit 33 of a timeout Upon reception of this notification, the short-range radio control circuit 33 notifies the control circuit 27 of the corresponding information.

The control circuit 27 for monitoring the state of the mobile station 1 checks the state of supply/shutdown of power to unnecessary circuit sections and the state of interrupt in association with power saving of the mobile station 1 (S6). If there is no interrupt caused by an incoming call, key operation, or the like during a predetermined time Ts, the mobile station 1 shifts to a state (power saving mode) in which power consumption is reduced in the ON state of the power (S7). In synchronism with this operation, the control circuit 27 sends a control signal for turning off the short-range radio function to the short-range radio control circuit 33, and sends, to the power control circuit 26, a control signal for stopping the supply of power to the short-range radio control circuit 33 and short-range radio RF section 38. Note that in the power saving mode in step S7, for example, power shutdown and power saving in the display portion and power shutdown and power saving in circuits that are not used during standby state are executed.

Upon reception of this control signal, the power control circuit 26 stops the supply of power to the short-range radio control circuit 33 and short-range radio RF section 38. This prevents the cell phone from consuming power in the short-range radio functional section, and can completely stop the short-range radio function (S8).

During an interrupt or the like, the flow returns from step S6 to step S3 to keep the short-range radio function active.

If a connection request is sent from another short-range radio unit before a lapse of the predetermined time (X sec) (S5) and connection is established, the mobile station 1 shifts to the connection completion/connection state (S9).

At this time, the short-range radio control circuit 33 monitors the communication state with another short-range radio unit (S10). If it is determined that data communication is being done (YES), the short-range radio connection state is maintained. Otherwise, the short-range radio control circuit 33 controls count starting/zero-clearing operation of the timer circuit 32. The timer circuit 32 counts the time for a predetermined time (Y sec) during the short-range radio connection state (S11), and then notifies the short-range radio control circuit 33 of a timeout. The short-range radio control circuit 33 further notifies the control circuit 27 of the timeout.

The control circuit 27 for monitoring the state of the mobile station 1 checks the state of the mobile station 1 in association with power saving and interrupt (S13). If there is no interrupt for the predetermined time Ts (S7), the control circuit 27 shifts the mobile station 1 to the power saving mode (S14). At this time, the control circuit 27 notifies the short-range radio control circuit 33 that the mobile station 1 shifts to the power saving mode.

The short-range radio control circuit 33 is triggered by this notification to transmit a request or instruction to shift the short-range radio function to the low power consumption mode to the remote station which has generated the connection request at the time of the establishment of connection and is now being connected through the short-range wireless transmission circuit 35, transmission/reception multiplexer 36, and antenna 37.

If the request to shift to the low power consumption mode is accepted by the connected remote station, the short-range radio control circuit 33 notifies the control circuit 27 of this, thereby shifting the short-range radio function to the low power consumption mode (S15). At this time, the control circuit 27 does not stop the supply of power to the short-range radio control circuit 33 and short-range radio RF section 38 through the power control circuit 26.

The control circuit 27 monitors the interrupt state. If an interrupt occurs, and the mobile station 1 is restored from the power saving mode (S16), the control circuit 27 starts supplying power to the short-range radio control circuit 33 and short-range radio RF section 38, and notifies the short-range radio control circuit 33 of the corresponding information. The short-range radio control circuit 33 then requests the remote station with which short-range radio communication is performed to restore from the low power consumption mode. If this restore request is accepted, the short-range radio function shifts to a connection state (S9).

During the connection state, an interrupt concerning power saving or the like in the mobile station 1 is checked (S13). The short-range radio function continues the connection state during the occurrence of the interrupt.

If disconnection processing occurs due to an instruction to disconnect short-range radio communication from the user with the input keys 31, a disconnection request from the remote station, or the like before the timer circuit 32 counts the predetermined time (Y sec) (S12 and S17), the mobile station 1 shifts to the standby state again (S3).

A mobile station according to another embodiment of the present invention will be described next.

Figure 6:
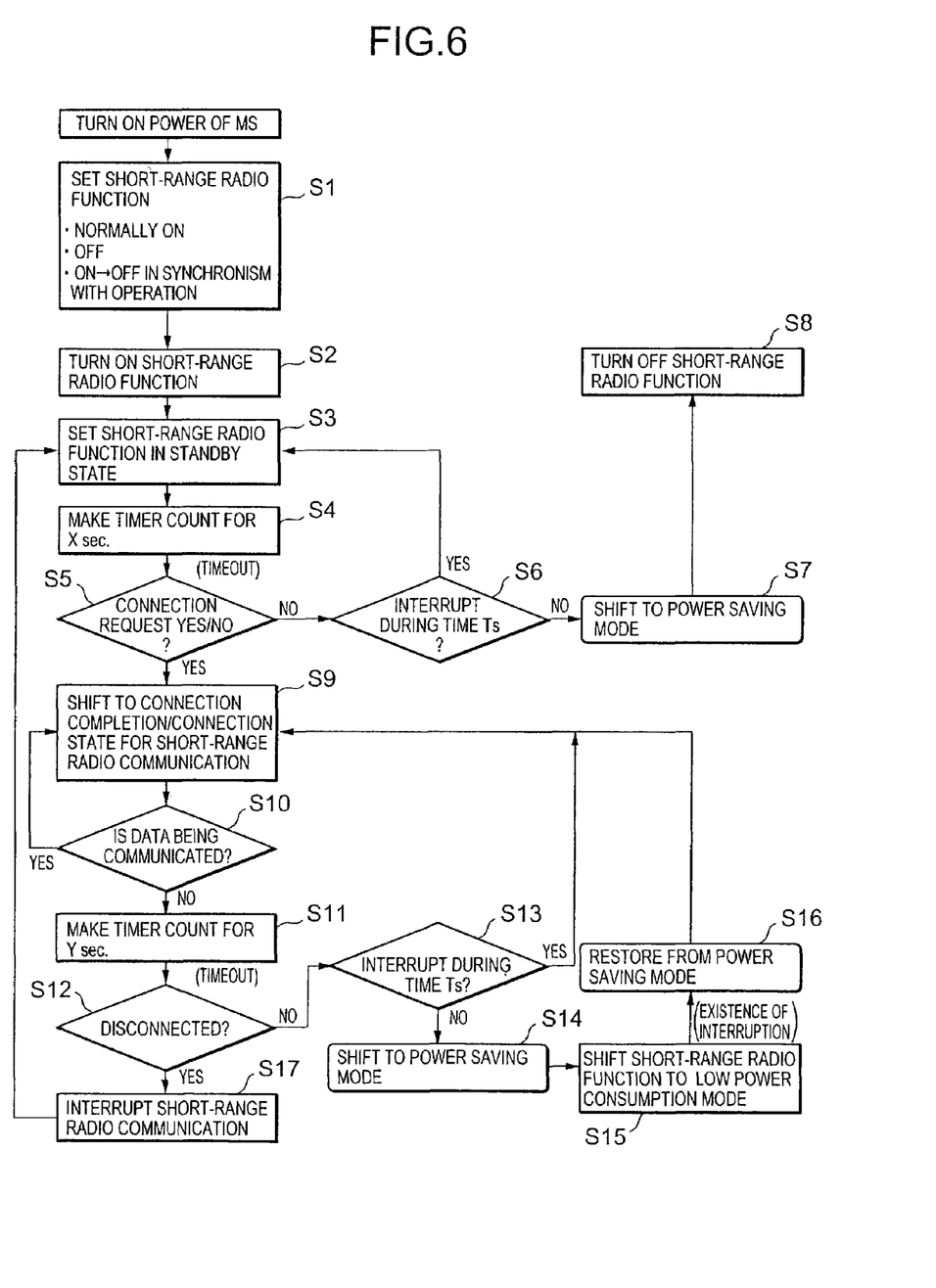
FIG. 6 is a flow chart showing processing in the mobile station in FIG. 1.

In the embodiment shown in FIG. 6, the mobile station 1 operates as a salve (searched side). However, the present invention is not limited to this, and is also applied to a case wherein the mobile station 1 operates as a master.

When the short-range radio function is turned on, a mobile station 1 may not be set in the standby state as a state to be found (slave) but may operate as a station to find (master) A short-range radio control circuit 33 control this operation.

The mobile station 1 has a function of setting a time during which a radio wave is transmitted to find a station when the mobile station 1 operates as a station to find. This function serves to search for a neighboring unit in the standby state for a predetermined period of time. The mobile station 1 preferably has a user interface for displaying a selection window which allows the user to select a re-search or turning off of the function if no unit to communicate can be found by such a search.

If, for example, no input operation is done on this selection window for a predetermined period of time, the short-range radio function can be automatically turned off by a control circuit 27 using the above technique.

At this time, the control circuit 27 sends a control signal to turn off the short-range radio function to the short-range radio control circuit 33, and sends, to a power control circuit 26, a control signal to stop the supply of power to the short-range radio control circuit 33 and a short-range radio RF section 38. Upon reception of this control signal, the power control circuit 26 stops the supply of power to the short-range radio control circuit 33 and short-range radio RF section 38. This stops the short-range radio function from consuming power, and hence a power consumption reducing effect can be obtained.

In the above embodiment, as shown in FIG. 6, if no data is actually exchanged by short-range radio communication, the mobile station 1 itself is also set in the power saving mode (S7, S14), the short-range radio function is turned off (S8), and the low power consumption mode is set (S15). However, the present invention is not limited to this. If no data is actually exchanged by short-range radio communication, the mobile station 1 itself may not be set in the power saving mode, and only the short-range radio function may be turned off or set in the low power consumption mode.

In addition, the short-range radio function may operate in the low power consumption mode to intermittently turn on/off the power to the short-range radio control circuit 33 and short-range radio RF section 38 or keep the power off until the occurrence of an interrupt.

As conditions that make the short-range radio function shift to the low power consumption mode, the following conditions are enumerated in addition to the condition that no interrupt occurs in the control circuit 27 for a predetermined period of time during the standby state for short-range radio communication or a short-range radio connection state and the mobile station 1 is set in the power saving mode, as indicated by steps S6, S7; S13, and S14 in FIG. 6. Cases (1) to (4) will be described below one by one.

(1) The mobile station 1 is operating as a master and connection for short-range radio communication has not been completed.

A folding mobile station like the one shown in FIG. 4 has shifted to a form in which the short-range radio function is not used (for example, a folded state).

A backlight 29 shown in FIG. 5 is turned off.

A predetermined period of time has elapsed with no slave being found since the short-range radio function was turned on.

A series of operations for a search for a slave is completed.

(2) The mobile station 1 is operating as a master, and connection for short-range radio communication has been established.

A folding mobile station like the one shown in FIG. 4 has shifted to a form in which the short-range radio function is not used (for example, a folded state).

The backlight 29 shown in FIG. 5 is turned off.

No data is exchanged with a remote station in short-range radio communication for a predetermined period of time.

(3) The mobile station 1 is operating as a slave, and connection for short-range radio communication has not been established.

A folding mobile station like the one shown in FIG. 4 has shifted to a form in which the short-range radio function is not used (for example, a folded state).

The backlight 29 shown in FIG. 5 is turned off.

A predetermined period of time has elapsed with no master being found since the short-range radio function was turned on.

(4) The mobile station 1 is operating as a slave, and connection for short-range radio communication has been established.

A folding mobile station like the one shown in FIG. 4 has shifted to a form in which the short-range radio function is not used (for example, a folded state).

The backlight 29 shown in FIG. 5 is turned off.

No data is exchanged with a remote station in short-range radio communication for a predetermined period of time.

Assume that in the case shown in FIG. 5, the control circuit 27 detects the state in which the folding mobile station is folded or the state in which the backlight 29 is turned off, and the short-range radio control circuit 33 detects that a predetermined period of time elapses with no slave being found since the short-range radio function is turned on, that a series of operations for a search for a slave is completed, that no data is exchanged with a remote station in short-range radio communication for a predetermined period of time, and that a predetermined period of time elapses with no master being found since the short-range radio function is turned on.

With this operation, the short-range radio function can be shifted to the low power consumption mode in synchronism with folding operation or operation of turning off the backlight, thereby attaining a reduction in power for the short-range radio in accordance with the operation state of the mobile station. In addition, the power for the short-range radio function can be reduced in accordance with a search for a master or slave as a short-range radio function.

Assume that the display portion 14 of the mobile station 1 is a display portion without any backlight like an organic EL. Even in this case, if the mobile station 1 has a function of adjusting a current, voltage, or the like by monitoring an interrupt such as key input operation, the same effect as described above can be obtained by applying the present invention to such a case.

Obviously, the present invention can be applied to a mobile station other than a folding mobile station.

What is claimed is:

1. A mobile station with a short-range radio function including a radio section which communicates with a base station and a short-range radio section for performing short-range radio communication independently of said radio section, comprising:
   control means for shifting the short-range radio function of said short-range radio section to a low power consumption mode in accordance with a state of short-range radio communication without receiving an external command from said base station, and wherein all short-range radio signals are stopped.

2. A mobile station with a short-range radio function including a radio section which communicates with a base station and a short-range radio section for performing short-range radio communication independently of said radio section and having a power saving mode of turning off a backlight mounted on a display portion when no operation is performed by a user for not less than a predetermined period of time, comprising:
   control means for shifting the short-range radio function of said short-range radio section without receiving an external command from said base station, to a low power consumption mode in synchronism with the power saving mode and wherein all short-range radio signals are stopped.

3. A folding mobile station with a short-range radio function including a radio section which communicates with a base station and a short-range radio section for performing short-range radio communication independently of said radio section, comprising:
   control means for shifting the short-range radio function of said short-range radio section without receiving an external command from said base station, to a low power consumption mode when said short-range radio function is not used, and wherein all short-range radio signals are stopped.

4. A station according to claim 1, wherein said control means shifts the short-range radio function of said short-range radio section to the low power consumption mode when no data is exchanged by short-range radio communication for not less than a predetermined period of time.

5. A station according to claim 2, further comprising control means for, when operation is done by the user in the power saving mode, restoring the short-range radio function of said short-range radio section from the low power consumption mode upon execution of control for restoration from the power saving mode to a normal mode in which the backlight is turned on.

6. A station according to claim 3, further comprising control means for restoring the short-range radio function of said short-range radio section from the low power consumption mode when the short-range radio function is used.

7. A station according to claim 1, wherein the low power consumption mode is a mode of stopping supply of power to said short-range radio section.

8. A station according to claim 2, wherein the low power consumption mode is a mode of stopping supply of power to said short-range radio section.

9. A station according to claim 3, wherein the low power consumption mode is a mode of stopping supply of power to said short-range radio section.

10. A station according to claim 4, wherein the low power consumption mode is a mode of stopping supply of power to said short-range radio section.

11. A station according to claim 1, wherein the low power consumption mode is a mode of intermittently stopping supply of power to said short-range radio section.

12. A station according to claim 2, wherein the low power consumption mode is a mode of intermittently stopping supply of power to said short-range radio section.

13. A station according to claim 3, wherein the low power consumption mode is a mode of intermittently stopping supply of power to said short-range radio section.

14. A station according to claim 4, wherein the low power consumption mode is a mode of intermittently stopping supply of power to said short-range radio section.

15. A power consumption reducing method for a mobile station with a short-range radio function including a radio section which communicates with a base station and a short-range radio section for performing short-range radio communication independently of the radio section, wherein power consumption is reduced by shifting the short-range radio function of the short-range radio section to a low power consumption mode in accordance with a state of short-range radio communication without receiving an external command from said base station, and wherein all short-range radio signals are stopped.

16. A power consumption reducing method for a mobile station with a short-range radio function including a radio section which communicates with a base station and a short-range radio section for performing short-range radio communication independently of the radio section and having a power saving mode of turning off a backlight mounted on a display portion when no operation is performed by a user for not less than a predetermined period of time, wherein power consumption is reduced by shifting the short-range radio function of the short-range radio section without receiving an external command from said base station, to a low power consumption mode in synchronism with the power saving mode and wherein all short-range radio signals are stopped.

17. A power consumption reducing method for a folding mobile station with a short-range radio function including a radio section which communicates with a base station and a short-range radio section for performing short-range radio communication independently of the radio section, wherein power consumption is reduced by shifting the short-range radio function of the short-range radio section without receiving an external command from said base station, to a low power consumption mode when the short-range radio function is not used and wherein all short-range radio signals are stopped.

18. A method according to claim 15, wherein power consumption is reduced by shifting the short-range radio function of the short-range radio section to the low power consumption mode when no data is exchanged by short-range radio communication for not less than a predetermined period of time.

19. A method according to claim 15, wherein the low power consumption mode is a mode of stopping supply of power to the short-range radio section.

20. A method according to claim 16, wherein the low power consumption mode is a mode of stopping supply of power to the short-range radio section.

21. A method according to claim 17, wherein the low power consumption mode is a mode of stopping supply of power to the short-range radio section.

22. A method according to claim 18, wherein the low power consumption mode is a mode of stopping supply of power to the short-range radio section.

23. A method according to claim 15, wherein the low power consumption mode is a mode of intermittently stopping supply of power to the short-range radio section.

24. A method according to claim 16, wherein the low power consumption mode is a mode of intermittently stopping supply of power to the short-range radio section.

25. A method according to claim 17, wherein the low power consumption mode is a mode of intermittently stopping supply of power to the short-range radio section.

26. A method according to claim 18, wherein the low power consumption mode is a mode of intermittently stopping supply of power to the short-range radio section.

* * * * *